R. J. W. BROWN.
BREECH MECHANISM FOR AUTOMATIC RECOIL OPERATED GUNS.
APPLICATION FILED APR. 26, 1910.

1,021,130.

Patented Mar. 26, 1912.

3 SHEETS—SHEET 1.

WITNESSES:

INVENTOR.
RICHARD JAMES WAINWRIGHT BROWN,
by
Attorney.

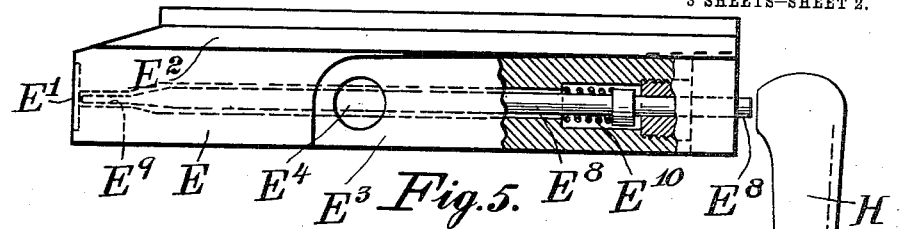
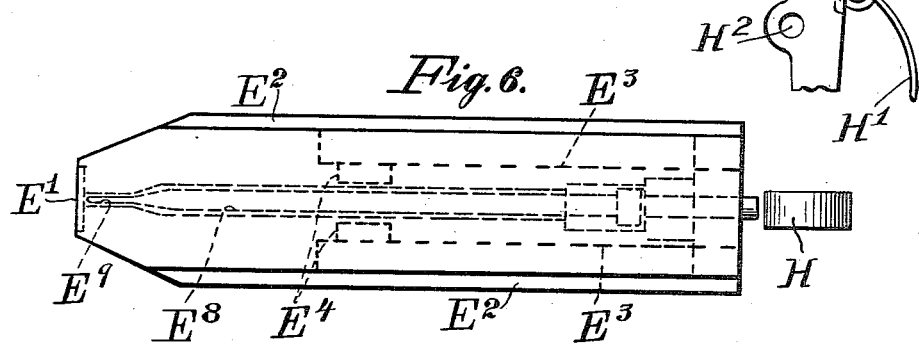
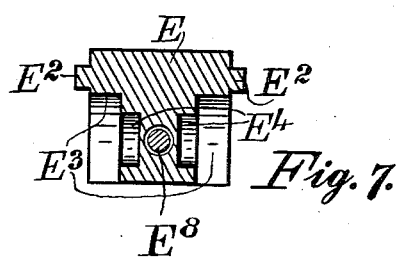
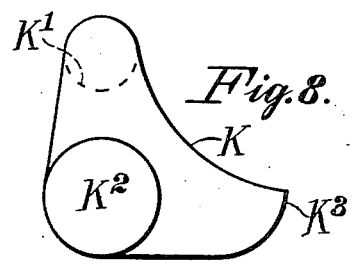
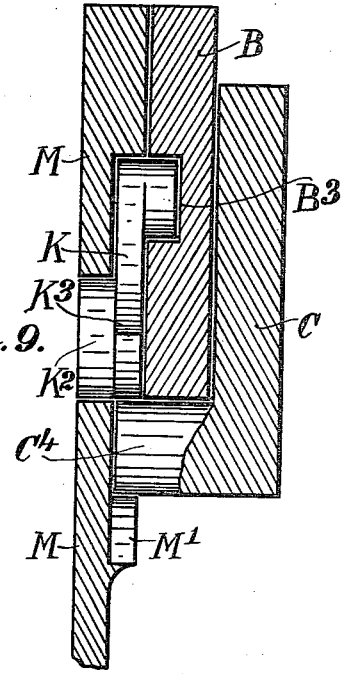

R. J. W. BROWN.
BREECH MECHANISM FOR AUTOMATIC RECOIL OPERATED GUNS.
APPLICATION FILED APR. 26, 1910.
1,021,130.
Patented Mar. 26, 1912.
3 SHEETS—SHEET 3.
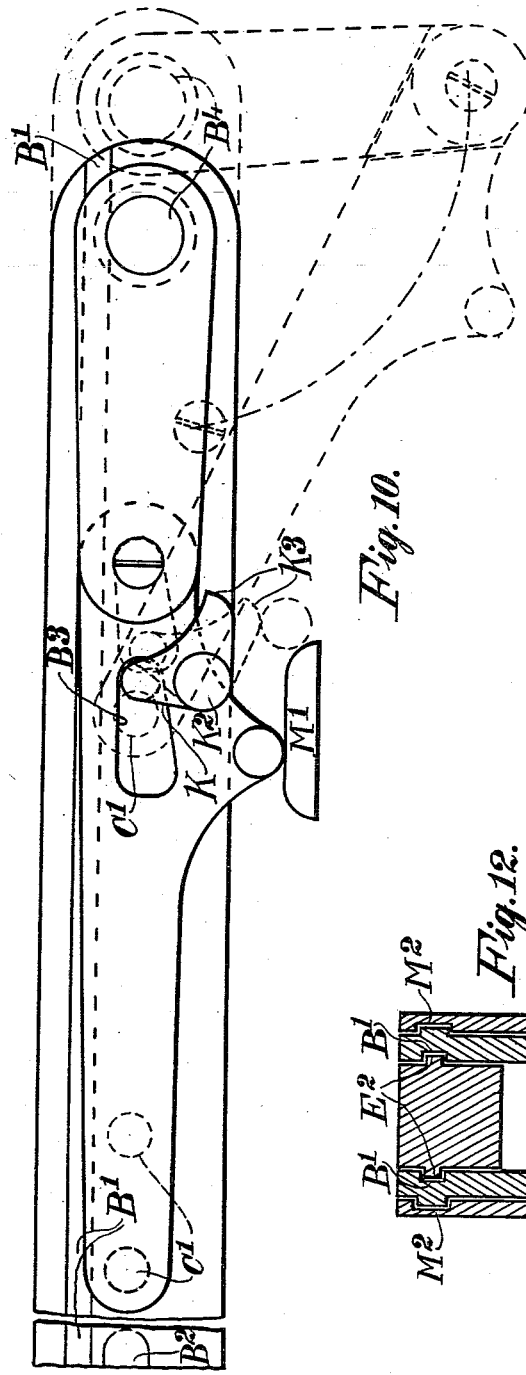
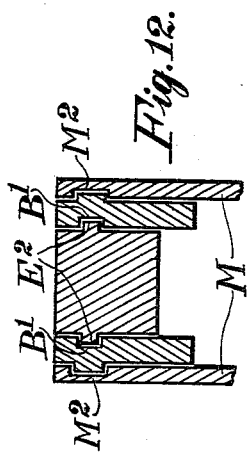
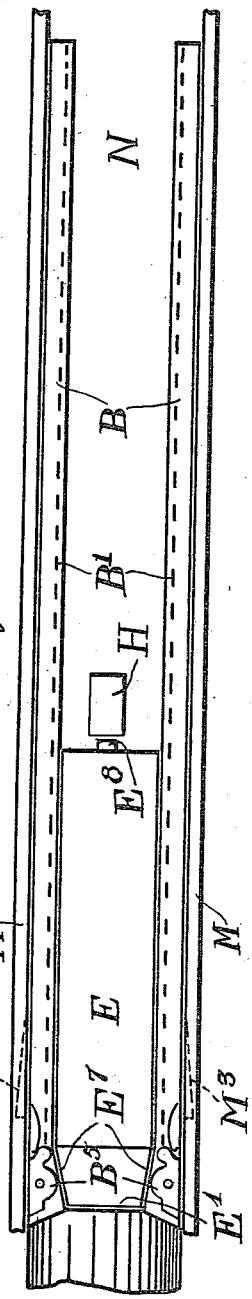
WITNESSES:
INVENTOR,
RICHARD JAMES WAINWRIGHT BROWN,
by
Attorney.

UNITED STATES PATENT OFFICE.

RICHARD J. W. BROWN, OF LONDON, ENGLAND.

BREECH MECHANISM FOR AUTOMATIC RECOIL-OPERATED GUNS.

1,021,130.

Specification of Letters Patent. Patented Mar. 26, 1912.

Application filed April 26, 1910. Serial No. 557,832.

*To all whom it may concern:*

Be it known that I, RICHARD JAMES WAINRIGHT BROWN, a citizen of the United Kingdom of Great Britain and Ireland, residing in London, England, have invented certain new and useful Improvements in and Relating to Breech Mechanism for Automatic Recoil-Operated Guns, of which the following is a specification, such as will enable others skilled in the art to which it appertains to make and use the same.

The object of this my invention is to produce a new system for the construction of firearms which are automatic in their action, which system is applicable to all caliber and types, provided only that such firearms are constructed in such a manner that it is possible to use with them a metal cartridge-case for the reception of the explosive employed to propel the projectile.

In order that my invention may be clearly understood, I have annexed drawings hereto illustrative thereof to which I make reference in the accompanying specification.

To this end I have provided a barrel receiver slidable in the stationary part of the fire-arm and in which the breech-block slides, the breech-block and the receiver being connected by downwardly breaking toggle levers, at times held against downward movement by ribs on the stationary part but at the proper time moved downwardly by a tumbler rocked by the movement of the receiver. I have also provided catches for holding the receiver in rearward position in order to insure the safe and positive reloading of the barrel and receiver.

Figure 1:
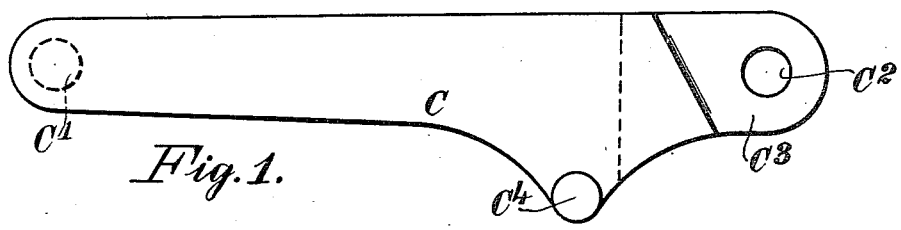
Figure 2:
Figure 3:
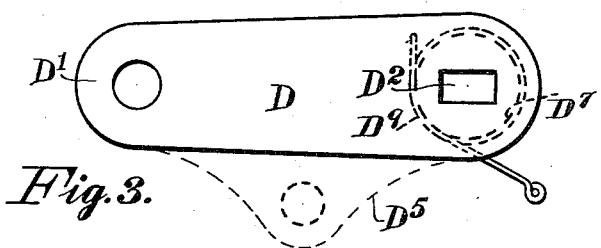
Figure 4:
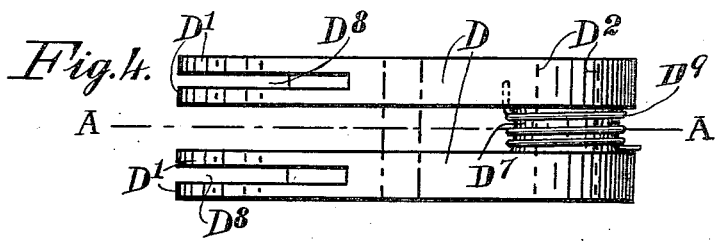

In the accompanying drawings; Figure 1 is a side elevation of one of the toggle levers. Fig. 2 is a plan view of a pair of these same levers. Fig. 3 is a side elevation of the rear toggle. Fig. 4 is a plan view showing a pair of the rear toggle levers. Fig. 5 is a side elevation, partly in section, of the breech-block. Fig. 6 is a plan of the breech-block. Fig. 7 is a cross-sectional view of the same. Fig. 8 is a side elevation of one of the tumblers. Fig. 9 is an enlarged cross sectional view of the receiver and the non-recoil part, and showing a tumbler in end elevation. Fig. 10 is a side elevation showing the receiver, toggle levers and a tumbler assembled. Fig. 11 is a plan showing the non-recoil side members, the receiver and the breech-block, and Fig. 12 is a cross-sectional view through Figs. 11 and 12.

The automatic action of these weapons is obtained by a breech-mechanism consisting of a forked receiver such as B of Fig. 11 into the front end (Fig. 10) of which the barrel is screwed in such a manner that the breech of the barrel forms the commencement of the fork, which latter consists of flat rearward continuations of the sides of the receiver B in such a manner as to leave a space N, N, Fig. 11, of suitable width between them. This space between the forks being uniform throughout the whole length of the forked part of the receiver B, except at the front end where it is tapered in a suitable manner to form guides for the front end of the breech block or bolt E and thus insure that the bolt face E', Figs. 5, 6 and 11 is exactly central behind a cartridge. The tapered sides at the front end of this forked portion also serve two other purposes, the first being the strengthening of the receiver at the breech, whereat it receives the first of the recoil strains, the second being that it serves as a guide for the cartridges during their insertion into the breech chamber.

It will be understood that the rear face of the barrel (in which is the breech chamber) forms the front end of the forked part and terminates the space between the forks, the threaded portion of the receiver being suitably cut out to give it the necessary shape and form. In the interior faces of the forked portion of this receiver "featherways" are B' cut, see Figs. 10, 11 and 12, one being in each prong of the forked part. These grooves or featherways are approximately 3/32 of an inch in depth and in them slide the "feathers" or longitudinal projections $E^2$ (see Figs. 5, 6, 7, and 12) of the breech-block or bolt E. These feathers on the bolt maintain the relative position of the bolt E to the receiver B, allowing it free movement backward and forward when moving during the recoil or return. Thus we see that the bolt or breech-block travels to and fro on the same center line as the axis of the barrel, and directly behind it, so that all strain and movement is taken in a direct and straight line rearward.

The bolt or breech-block has suitable feathers or projections $E^2$ (Figs. 5, 6, 7, and 12) left upon it, inserted into or otherwise attached to it, in such a manner as to permit of their fitting easily and moving freely backward and forward in the featherways B' (Figs. 10, 11 and 12), cut in the interior faces of the forks.

There is a suitable recess $E^3$ (Figs. 5, 6, and 7), cut on each side of the breech-block, in such a manner as to form a shoulder on each side. These recesses being continued rearward the whole length of the bolt so that the bolt is somewhat of a T shape in cross section, and there is a solid portion of the bolt in front of the recesses and also above them. These recesses are rounded at their front end so as to receive the rounded end of the bolt levers C (Figs. 1 and 2). There are also drillings $E^4$ (Figs. 5, 6, and 7), through the walls of the breech-block behind the shoulders left by the recessing process. These drillings being situated one on each side and at the centers of which the radial shoulders form parts of the circumferences. These drillings are for the reception of circular bosses, C' (Figs. 1, 2, and 10), which are left upon the bolt levers, one upon the interior front end of each lever. Thus it will be understood that when the levers are in their places in the recesses referred to, and the bosses or studs on the levers are seated in the drillings prepared for them, the exterior faces of the levers C will be flush with the non-recessed portion of the breech-block, and they will also be free to swing in and out of the recesses, being pivoted upon the studs or bosses C' before referred to. In this way the shock of recoil is transmitted from the face of the breech-block to the rounded ends of the bolt levers and also to the bosses or studs on these levers, the drillings and recesses being so situated so as to absorb and transmit the shock of recoil in the same straight and horizontal rearward line as the axis of the barrel.

In the rear ends of the bolt levers C (Figs. 1 and 2) there are drillings $C^2$ of suitable size, one in each lever, for the reception of a bolt or screw or similar fastening, which shall serve to connect the bolt-levers C to the recoil levers D (Fig. 3). To provide for the greater strength of the joints of the two sets of levers it will be understood that as soon as the bolt levers C have projected rearward past the end of the breech-block E (Figs. 5 and 6), that they thicken out inwardly i. e. toward each other, and thus provide more substance from which to cut the tongues $C^3$ (Figs. 1 and 2) which fit between the jaws D' (Fig. 4) situated at the front end of the recoil levers and are fixed in the spaces $D^8$.

Attached to the rear end of the bolt levers C are the divided ends of the recoil levers D. These latter having their front ends suitably thickened, if desired, in a similar manner to the bolt levers, to permit of the cutting of suitable spaces $D^8$ (Fig. 4), forming jaws, for the reception of the tongues, $C^3$ of the bolt levers C. Having assembled the bolt and recoil levers they may then be suitably joined by a bolt or screw or other device which passes through the drilling $C^2$ and $D^2$ (Figs. 1, 2, 3, and 4), provided for their reception, and thus make the joint. These recoil levers D (Figs. 3 and 4) may be constructed either in one piece or in separate halves, cut on the line A, A, Fig. 4, as deemed suitable for any one of the various types of guns or other firearms constructed on this principle. The recoil levers D continue rearward from their junction with the bolt levers C for a suitable distance at which point there is a boss or stud left upon the exterior face of each lever. The recoil levers may be made in one piece, similar to a double armed crank and instead of having bosses, as described, there is a slot cut through the barrel of the crank through which the action pin passes, and this pin has a collar on one end and a head on the other, which head and collar take the place of the studs or bosses above referred to. These studs or the head and collar of the action pin, as the case may be, seat into drillings provided for them in the sides of the receiver fork B at $B^4$ (Fig. 10), these drillings being on the same center line as the axis of the barrel.

In order to provide a means whereby the movement of the bolt may be controlled, there may be crank arms $D^5$ (Fig. 3) on the undersides of the recoil levers or crank of a suitable length and construction to permit of the attachment of suitable springs or spring operated devices either directly or indirectly attached to the crank arms which latter are part and parcel of the recoil levers. Another manner in which the same effect can be obtained is to do away with the dropped part $D^5$ Fig. 3, and wind a spring such as $D^9$ around the barrel D, of the crank (see Figs. 3 and 4), and attach one end of it to the receiver, the other end being attached to the barrel, similar to a clock spring attachment to its spindle. The bosses or studs upon the levers may be slotted through for the reception of an action pin as at $D^2$ (Figs. 3 and 4), or such pin or similar device may be in other suitable manner attached to it, and upon such pin, the breech opening lever or handle is situated or attached in any suitable manner, thus providing a "straight pull" breech mechanism, which requires only a sharp rearward pull to open the breech and which, on the lever or handle being released, closes the breech automatically.

On the exterior faces of the receiver at the front and rear ends, are feathers $B^2$ Fig. 12, left solid, inserted or otherwise attached to the receiver. These feathers are preferably situated on the same center line as the axis of the barrel, and seat into and move to and fro in featherways or grooves M² (Figs. 11 and 12) suitably cut in a frame work M which constitutes the exterior portion of these weapons. There are two feathers on each side and they are preferably diametrically opposite each other. The bracket plates of the outer framework M (Figs. 11 and 12), are situated one on either side of the receiver B in such manner that when the feathers B² are in the featherways M² the whole of the receiver with its interior mechanism is free to slide backward upon recoil, and forward again upon the springs asserting themselves. This bracket M may consist of one piece or more, as preferred, and is suitably constructed so as to permit of its being fastened together as a whole and maintain such relative position as to permit of the movement as described above, and at the same time to be one united compact piece.

The locking of these weapons during firing and recoil is a most important feature on account of its insuring the efficiency of the guns, safety of the operators, and correctness in opening the breech, i. e. the timing of the unlocking of the breech from the barrel and receiver. This "locking" is provided very simply, in the following manner:—Upon the bolt levers C (Figs. 1 and 2), at a suitable distance from the front ends and in such position as to come below the lower edge of the receiver forks B and to rest against their under edges, are studs or bosses C⁴ on their exterior faces. These bosses are preferably left solid on the levers. It will be advantageous to the life and easy working of these guns if these studs or bosses are situated at a point on the levers which shall be exactly half-way between the centers of the bosses C' (Figs. 1 and 2), on the front ends of the bolt levers C and the centers of the bosses D² on the rear ends of the recoil levers D (Figs. 3 and 4). (In this position the strain comes equally upon both sets of levers.) It will be understood that the levers will be suitably constructed to carry these bosses or studs which control the locking.

The locking and unlocking of the breech of these guns is timed, governed or controlled in such a maner as to insure that the bullet or projectile has left the muzzle before the breech is opened. This is done by providing a suitable device for the absorption of the surplus recoil, such as springs, cylinders filled with oil or the like; and after that the necessary or suitable amount of force to be exerted by such recoil springs or recoil cylinders in order to absorb the surplus recoil within a suitable distance is ascertained, the unlocking grooves or projections M', Fig. 9, are then designed and cut in the inside faces of the outer bracket M or its plates, in such a position and manner as to insure their reception of the outer end of the locking boses or studs C⁴, on the bolt levers, also that they may move freely in the grooves or over the projections thus provided for their reception. These grooves or projections are situated one in or on each plate of the brackets M as detailed, one on each side as required for the reception of the locking studs or bosses C⁴ on the levers C.

It will be remembered that the locking studs C⁴ rest against the under side of the receiver forks, therefore it follows that the top of these grooves will be on the same line as the under edge of the receiver B or in the case of projections or ribs being employed that there must be sufficient space between the top edge of the ribs, projection or rail, and the under edge of the receiver to receive the end of the studs C⁴ thus forming a groove-like space in which the studs will work; also it follows that these studs shall project sufficiently far outward beyond the receiver forks to enter the grooves or project over the ribs or rails M' in such a manner as to insure their proper operation at all times. These grooves or ribs are continued rearward and are of such width and depth as to insure the operation of the studs and are also absolutely parallel for part of the length with the underside of the receiver and then turn downward with a short curve. This downward turn, will on recoil, in the case of grooves being used, force the studs C⁴ downward, and consequently break the relative horizontality which the levers had hitherto maintained during recoil (owing to the relative horizontal portions, as described). The lever joint being thus broken downward, the residue of the expanding gases will be sufficient to retire the breech-block and thus extract and eject the now empty cartridge case from the weapon by striking it against a suitably placed and constructed ejector. Another manner in which the unlocking may be effected is as follows:—Instead of having a groove cut in the frames, as described above, there is a rib M' (Fig. 10) on each inner face of the frame plates taking under the bosses or studs on the levers. These ribs terminate at a point which is determined in relation to the relative travel of the studs C⁴ and over the terminating points there are tumblers, eccentrics or cams K (Figs. 10 and 8) which are held by bosses K² in the bracket or non recoil part M (Figs. 9 and 10). There are two other studs K' one on each of these tumblers or cams K which seat in recesses B³ (Figs. 10 and 9) cut in the receiver forks B, in their outside faces. The termination of the recesses is so arranged as to upset the tumblers or cams K at such time as the studs C⁴ on the levers C are over the cutaway portion of the ribs M' Fig. 10 on the frame so that the downward movement of the arm K³ of the tumblers K will throw the studs C⁴ on the lever C downward also, thus breaking the toggle lever joint downward after which the residue of the gas will exert sufficient pressure to retire the breech-block E as before described.

In order to insure the safe and positive reloading, the barrel and receiver are caught back by suitable catches such as B⁵ of Fig. 11, which catches are spring controlled and pivoted, and engage with recesses M³ in the side plates or brackets of the outer frame M (non recoil part), one at each side, and retain the barrel and receiver in the recoiled position until such time as the breech has closed again under the influence of a spring-device referred to previously.

When the breech-block goes forward again it inserts a new cartridge in the breech (if one is ready for the reload) or else leaves the breech empty, and its sloping faces E′ operate the receiver-retaining-catches B⁵ by striking against their rear ends and thus relases the receiver which at once returns the whole mechanism to the "firing position" loaded ready to fire.

It will be understood that when the bolt recoils it carries the top of the hammer, such as H, Figs. 5, 6 and 11, back with it, and on continuing its recoil, re-cocks it, and that when the whole mechanism has returned to the "firing position" the hammer remains "cocked," and all that remains is to press the trigger, button or other suitable apparatus, whereupon the hammer will fly over and hit the rear end of the firing-pin, such as E⁸, Figs. 5, 6 and 11, which in its turn explodes the cap or detonator or other device for igniting the explosive charge. The bullet or projectile passes up the barrel as the barrel travels rearward under the influence of the gas expansion, and the same movement is repeated, as was before described.

It will be understood that there are different mountings applicable to these weapons, according to their caliber, the nature of the service they are designed for, whether naval or military, sporting or otherwise.

This system applies to magazine sporting rifles, repeating shot guns, magazine pistols, light and medium calibered artillery. The type of feed-device varies according to the type and nature of the weapon, its caliber and the service required of it, rifles, shot guns, and pistols being fed from a box magazine or similar device, machine guns and the lighter kinds of artillery being fed by means of a belt device, and the heavier kinds of artillery by means of a sliding tray, or similar device, by which the cartridges may be brought within the scope of the loading device proper. The extraction and ejection are insured by an ordinary claw type of extractor which is preferably fixed into the bolt or breech-block. The extractors vary in form and position and in the manner of their being held in the breech-blocks, according to the type and caliber of the gun they are designed for.

The firing-pin E⁸ is simple and consists of a pin having a tapered point E⁹, and a cylindrical portion around part of which a small coiled spring is seated, which latter retracts the firing-pin from the cartridge-head previous to the ejection of the latter, thus saving any fracturing of the point; this retractor spring is sufficiently strong to overcome the residue of tension on the hammer spring, such as H′, Fig. 5. The hammer consists of a pivoted piece of steel or other suitable metal, suitably shaped and held in such a position as to permit of the upper end moving radially backward on the part of H² under the influence of the breech-block or bolt, during recoil, and of returning under the influence of its own spring H′ when released by the firing device.

The firing mechanism of the heavy and medium calibers may be electrical as well as percussive; and in all types and calibers it may also be rendered completely automatic in its action.

It will be understood that the type of breech mechanism herein described will be the same in principle throughout all weapons constructed on this system though the feed device may necessarily be modified for the reasons previously stated. The ejector varies in type according to the nature and type of the gun for which it is designed. The whole or any of these mechanisms is self-contained and almost dust-proof, being covered in all over.

What I claim and desire to secure by Letters Patent is:—

1. In automatic recoil-operated guns, the combination of non-recoil members; a receiver slidable therebetween; a breech-block slidable in the receiver; toggle levers pivoted to each other and to the receiver and the breech-blocks; a projection carried by a toggle lever; stationary means for holding the projection against downward displacement during a portion of its movement; and a pivoted tumbler adapted to be engaged and rocked by the receiver and, when thus rocked, to engage and push downwardly said projection and, with it, the toggle levers.

2. In automatic recoil-operated guns, the combination of non-recoil members; a barrel receiver slidable therebetween; a breech-block slidable in said receiver; toggle levers pivoted to each other and to the breech-block and the rear part of said receiver; laterally projecting studs carried by certain of the toggle levers; ribs on the non-recoil members and over which said studs are adapted to slide respectively; and tumblers pivoted to said non-recoil members and adapted to be engaged and rocked by the receiver and adapted when thus rocked to engage and push downwardly said studs.

3. In automatic recoil-operated guns, the combination of a pair of non-recoil side members provided with recesses; a gun barrel; a barrel-holding receiver slidable between the non-recoil side members and screwed to, and in line with, the gun barrel and provided with recesses; a breech-block slidable in said receiver and also in line with the gun barrel; recoil-levers pivoted at their rear ends to the rear end of the receiver; bolt-levers pivoted at their front and rear ends with the front ends of the breech-block and the front ends of the recoil-levers respectively; laterally projecting studs on said bolt levers; tumblers pivoted to the non-recoil members and having studs received in said recesses of the receiver, and a cam adapted to engage the laterally projecting studs of the bolt-levers to throw the bolt-levers downward; ribs on the non-recoil members and on which the laterally projecting studs are adapted to ride; and catches on the receiver, adapted to engage in said recesses of the non-recoil members and to be released by the breech-block.

4. In automatic recoil-operated guns, the combination of a stationary part comprising a pair of non-recoil members provided with recesses; a barrel-holding receiver slidable between said members and provided with recesses; a gun-barrel secured to the receiver and in line with the path of movement thereof; a breech-block slidable in said receiver; a firing-pin in the breech-block, a spring for retracting the firing-pin; a hammer adapted to strike the firing-pin and to be cocked by the recoil of the breech-block; recoil-levers pivoted at their rear ends to the rear end of the receiver; bolt-levers pivoted at their front and rear ends to the front end of the breech-block and the front ends of the recoil-levers respectively; laterally projecting studs on the bolt-levers; tumblers pivoted to the non-recoil members and provided with studs received in said recesses of the receiver, and a cam adapted to engage the laterally projecting studs of the bolt levers, to throw the bolt and recoil-levers downwardly; ribs on the non-recoil members and on which the laterally projecting studs are adapted to ride; and catches on the receiver, adapted to engage in said recesses of the non-recoil members and to be released by contact of the breech-block.

RICHARD J. W. BROWN.

Witnesses:
H. D. JAMESON,
R. I. WILLIAMS.

---

Copies of this patent may be obtained for five cents each, by addressing the "Commissioner of Patents, Washington, D. C."